United States Patent
Hassan et al.

(10) Patent No.: US 8,185,120 B2
(45) Date of Patent: May 22, 2012

(54) CELLULAR SERVICE WITH IMPROVED SERVICE AVAILABILITY

(75) Inventors: Amer A. Hassan, Kirkland, WA (US); Billy R. Anders, Jr., Bothell, WA (US); Danny Allen Reed, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 89 days.

(21) Appl. No.: 12/732,705

(22) Filed: Mar. 26, 2010

(65) Prior Publication Data
US 2011/0237238 A1 Sep. 29, 2011

(51) Int. Cl.
H04M 1/00 (2006.01)

(52) U.S. Cl. ............... 455/442; 455/561; 455/562.1; 370/475

(58) Field of Classification Search ............ 455/422.1, 455/436, 561, 562.1; 370/208, 475
See application file for complete search history.

(56) References Cited

U.S. PATENT DOCUMENTS

| | | | | |
|---|---|---|---|---|
| 5,239,675 A * | 8/1993 | Dudczak | ............... | 455/436 |
| 5,295,178 A * | 3/1994 | Nickel et al. | ............... | 455/561 |
| 5,511,067 A * | 4/1996 | Miller | ............... | 370/335 |
| 5,802,173 A * | 9/1998 | Hamilton-Piercy et al. | . | 379/56.2 |
| 6,035,193 A * | 3/2000 | Buhrmann et al. | ......... | 455/426.1 |
| 6,104,935 A * | 8/2000 | Smith et al. | ............... | 455/562.1 |
| 6,169,895 B1 * | 1/2001 | Buhrmann et al. | ........... | 455/423 |
| 6,292,673 B1 * | 9/2001 | Maeda et al. | ............... | 455/522 |
| 6,370,396 B1 * | 4/2002 | Meiksin et al. | ............... | 455/560 |
| 6,415,133 B1 * | 7/2002 | Brede et al. | ............... | 455/3.05 |
| 6,496,694 B1 * | 12/2002 | Menon et al. | ............... | 455/426.2 |
| 6,584,303 B1 * | 6/2003 | Kingswood et al. | ............ | 455/73 |
| 6,597,912 B1 * | 7/2003 | Lu et al. | ............... | 455/445 |
| 6,711,403 B1 * | 3/2004 | Herrmann et al. | ......... | 455/422.1 |
| 6,728,365 B1 * | 4/2004 | Li et al. | ............... | 379/329 |
| 6,799,023 B2 * | 9/2004 | Pinola et al. | ............... | 455/234.1 |
| 6,850,764 B1 | 2/2005 | Patel | | |
| 6,853,847 B2 * | 2/2005 | Shioda et al. | ............... | 455/456.1 |
| 6,876,863 B1 * | 4/2005 | Schroeder et al. | ............ | 455/466 |
| 6,904,283 B2 * | 6/2005 | Li et al. | ............... | 455/450 |

(Continued)

FOREIGN PATENT DOCUMENTS
KR  10-2009-0021865 A  3/2009

OTHER PUBLICATIONS

White Space Networking with Wi-Fi like Connectivity—Published Date: Aug. 17, 2009 http://blog.seattlepi.com/microsoft/library/20090831whitefipaper.pdf.

(Continued)

*Primary Examiner* — William D Cumming
(74) *Attorney, Agent, or Firm* — Wolf, Greenfield & Sacks, P.C.

(57) ABSTRACT

A cellular communication system in which overload of a base station is averted by offering users the option to communicate using a spectrum outside of the spectrum allocated for cellular communication. Incentives are offered to connect to the base station using the alternative spectrum, which may not support communications at the same rate as could be supported using the spectrum allocated to the base station for cellular communications. Users may be selected to receive an offer to receive incentives based on range to the base station, with users closer to the base station being more likely to receive such an offer. The cellular communications system may be a 3G wireless system and the alternative spectrum may be white space in the digital TV spectrum.

20 Claims, 6 Drawing Sheets

U.S. PATENT DOCUMENTS

| | | |
|---|---|---|
| 6,909,879 B1 | 6/2005 | Centore, III |
| 6,912,403 B2 * | 6/2005 | Ahmad et al. ............... 455/522 |
| 6,963,746 B2 * | 11/2005 | Sato et al. ................... 455/450 |
| 6,975,869 B1 * | 12/2005 | Billon ....................... 455/452.1 |
| 7,050,799 B2 * | 5/2006 | Menon et al. ............. 455/426.2 |
| 7,181,175 B2 * | 2/2007 | Nimmo-Smith et al. ..... 455/101 |
| 7,272,418 B2 * | 9/2007 | Tsunehara et al. ......... 455/562.1 |
| 7,292,861 B2 * | 11/2007 | Rinne et al. ................ 455/452.1 |
| 7,355,962 B2 * | 4/2008 | Li et al. ......................... 370/208 |
| 7,454,212 B2 * | 11/2008 | Li et al. ......................... 455/450 |
| 7,489,934 B2 * | 2/2009 | Li et al. ......................... 455/453 |
| 7,499,711 B2 * | 3/2009 | Hoctor et al. .............. 455/456.1 |
| 7,564,816 B2 | 7/2009 | McHenry |
| 7,620,012 B2 * | 11/2009 | Farineau et al. ............. 370/329 |
| 7,639,199 B2 * | 12/2009 | Rofougaran ................... 343/860 |
| 7,664,534 B1 * | 2/2010 | Johnson ..................... 455/562.1 |
| 7,813,764 B2 * | 10/2010 | Vainikka et al. ............ 455/561 |
| 7,848,761 B2 * | 12/2010 | Caspi et al. ................ 455/456.1 |
| 7,885,617 B2 * | 2/2011 | Usuda et al. .................... 455/91 |
| 7,899,497 B2 * | 3/2011 | Kish et al. .................. 455/562.1 |
| 7,933,628 B2 * | 4/2011 | Kish et al. .................. 455/562.1 |
| 7,953,439 B2 * | 5/2011 | Rofougaran ................... 455/557 |
| 7,953,446 B2 * | 5/2011 | Legnain et al. ............. 455/562.1 |
| 7,974,311 B2 * | 7/2011 | Vesterinen et al. ........... 370/475 |
| 8,005,510 B2 * | 8/2011 | Fischer ........................ 455/561 |
| 8,010,161 B2 * | 8/2011 | Umeda et al. ................ 455/561 |
| 8,019,348 B2 * | 9/2011 | Choi et al. .................... 455/442 |
| 2008/0130519 A1 | 6/2008 | Bahl |
| 2008/0159207 A1 | 7/2008 | Levine |
| 2009/0196180 A1 | 8/2009 | Bahl |
| 2010/0048234 A1 | 2/2010 | Singh |

OTHER PUBLICATIONS

Unlicensed "White Space Device" Operations on the TV Band and the Myth of Harmful Interference—Published Date: Mar. 2008. http://www.newamerica.net/files/WSDBackgrounder.pdf.

Early Opportunities for Commercialization of TV Whitespace in the U.S.—Published Date: May 2008 http://ieeexplore.ieee.org/stamp/stamp.jsp?arnumber=04562539.

Quantifying the TV White Spaces Spectrum Opportunity for Cognitive Radio Access—Published Date: Dec. 12, 2009 http://www.springerlink.com/content/p1hrw58B75027542/fulltext.pdf.

Technical Challenges for Cognitive Radio in the TV White Space Spectrum—Published Date: Feb. 2009 http://ita.uesd.edu/workshop/09/files/paper/paper_1500.pdf.

Bahl et al., "White Space Networking with Wi-Fi like Connectivity," SIGCOMM'09, Aug. 17-21, 2009, chapter 4.

International Search Report and Written Opinion for International Application No. PCT/US2011/029926 mailed Nov. 22, 2011.

Nict, "Enabling Procedure of Communication in TVWS under FCC rules," IEEE 802.11, TGaf, IEEE 802.11-10/0261/1, Feb. 28, 2009.

\* cited by examiner

CELLULAR SERVICE WITH IMPROVED SERVICE AVAILABILITY

BACKGROUND

Mobile wireless devices, such as cellular telephones, are widely used. In addition to allowing users to carry on voice telephone calls, mobile wireless devices allow users to access data services through which users can obtain many forms of digital content. Users may surf the Internet, download video clips or send electronic messages, to name a few of the possible uses of mobile wireless devices.

Frequently, mobile wireless devices connect to data sources through cellular networks. The cellular networks include base stations distributed throughout an area in which cellular service is provided. In urban areas, the base stations may be spaced by about 300 meters. In rural areas, the base stations may be spaced by a distance of between about 1.5 and 2 Kilometers. Regardless of the spacing, the geographic regions around the base stations define "cells," with mobile devices in each cell connecting to the base station in that cell.

A mobile device, to connect to a data source, first makes a connection to a base station in its cell. The base station provides access to a network, such as the Internet, over which the mobile wireless device can then access data sources that are also coupled to the network. As mobile devices move from one cell to another, the base stations in those cells communicate to "handover" responsibility for continuing communication with the mobile device, such that communication is not lost even as the mobile device move out of the cell.

To support download of digital content and a growing number of other services, cellular networks have been upgraded to support higher bandwidth communications. State of the art networks communicating using a 3G wireless standard can support data communications at rates in excess of 1 Megabit per second (Mbps). However, it has been found that when many users are in the same cell—such as may occur in an urban area—a base station may become overloaded.

Overload can occur if the cumulative bandwidth that would be consumed if all of the devices communicated at the maximum data rate of the 3G service exceeds the capacity of the base station. When the base station is overloaded, each device is only able to communicate at a fraction of the rated bandwidth of the cellular service or admission to the network is rejected, causing frustration to the user. There are also common situations when mobile devices are at the edge of coverage of a cell where either less spectrum is available (such was mentioned earlier) or there is enough spectrum but providing broadband data requires high transmitted power. This is particularly problematic for portable devices (slate, Netbook, or a smart phone) where even 2 Mbps can drain the battery in less than 30 minutes at the edge of coverage. The same problem arises in building with link loss of 15 dB or higher; this can easily occur in buildings with metal tinted glass windows if devices are even a few meters away from the window, for instance.

SUMMARY

An improved experience for users of a cellular service is provided by providing a mechanism to, upon detection of a trigger condition—such as (1) an overloaded base station, (2) degradation in performance, (3) low battery level, and/or (3) increase in RF power from the mobile device—alter the frequency spectrum used by the base station to communicate with selected wireless devices. The frequency spectrum may be altered by moving to a lower licensed spectrum or unlicensed use of TV whitespace. Wireless devices may be selected based on being associated with users who agree to use of an alternative frequency spectrum. The users who continue to communicate with the base station using the assigned frequency spectrum of the base station may experience improved bandwidth for their communications because the load on the base station may be reduced. Though, users communicating over the alternative frequency spectrum may receive lower bandwidth for their communications.

Incentives may be offered to users to encourage then to accept lower bandwidth communication. The incentives may be financial, such as a discount or rebate associated with their cellular service. Though, other forms of incentives, such as free download of digital content at a future time may be offered.

Users contacted with an offer to communicate using the alternative frequency spectrum, and in some embodiments offered incentives to agree to use the alternative frequency spectrum, may be identified in any suitable way. For example, users offered the option to accept a lower bandwidth connection using the alternative frequency spectrum may be identified by time of first access to the cellular service or by range from the base station. If selected based on time, users attempting access to a network through a cellular base station that is already overloaded or is already communicating with wireless devices that in the aggregate consume more than a threshold percentage of bandwidth of the base station, may be offered an incentive to connect at a lower bandwidth. Alternatively or additionally, if selected by range, those users closest to a base station when an overload condition is detected may be offered an incentive.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
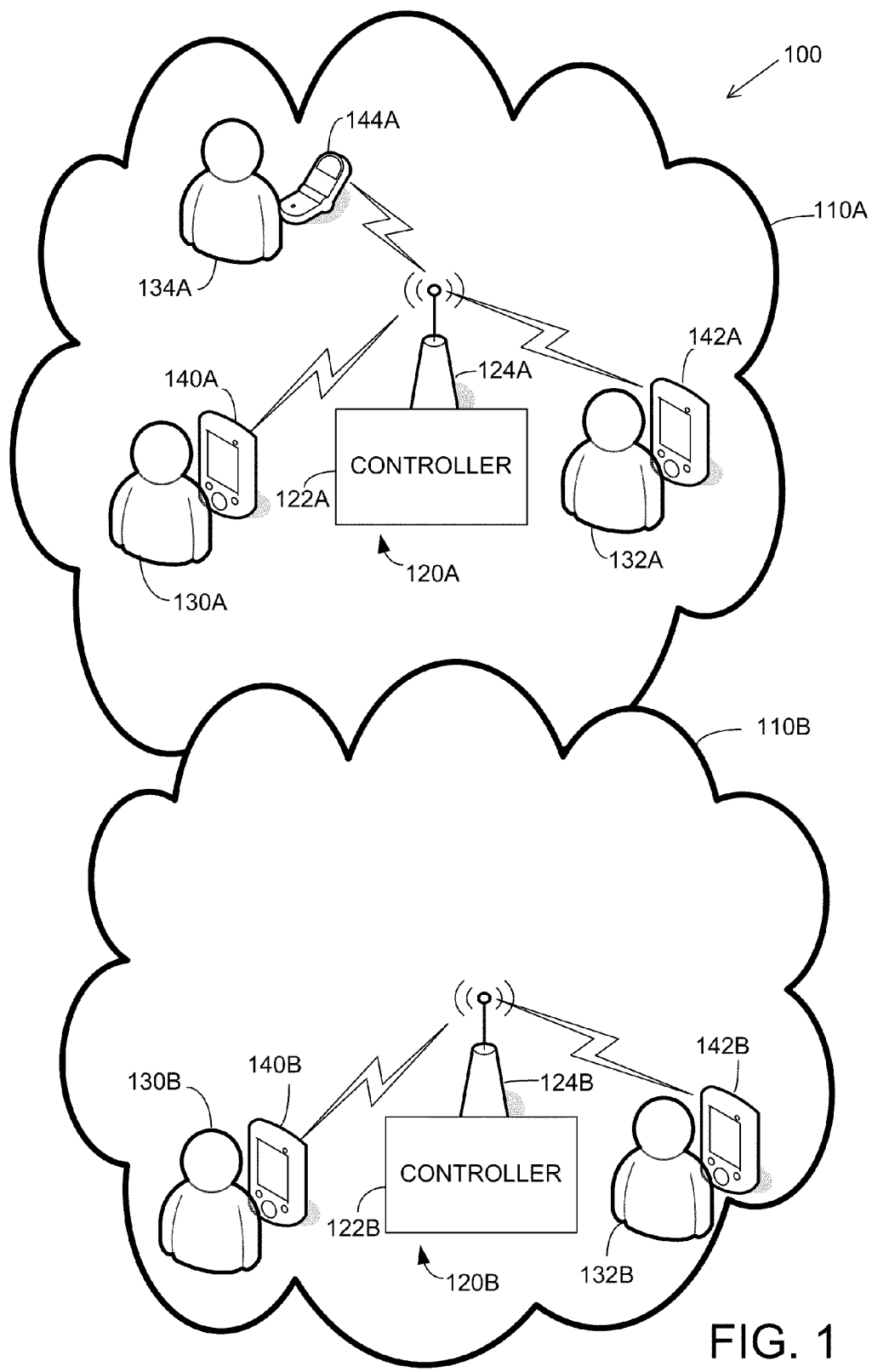
FIG. 1 is a conceptual sketch of a communication system according to some embodiments operating at a first time.

The inventors have recognized and appreciated that the frustrations some cellular users experience when they seemingly are unable to access high speed data services to which they have subscribed is sometimes the result of overloaded base stations. The inventors have further recognized and appreciated that these frustrations may be lessened by encouraging some users to communicate with a cellular base station using an alternative frequency spectrum. White space within the digital TV spectrum provides a suitable alternative frequency spectrum, particularly for users who are within a relatively short range of a base station.

Accordingly, in some embodiments, cellular base stations may be equipped to identify times when at least some users are offered an option to connect through an alternative frequency spectrum. Various approaches for determining when such offers are made and for selecting the users to receive such offers.

To determine the time when such offers are made, the base station may monitor aggregate bandwidth usage of all mobile devices in its cell. When aggregate usage approaches a threshold, the base station may be triggered to select users willing to accept communication using the alternative frequency spectrum.

Users willing to accept communications using an alternative frequency spectrum may be selected in any suitable way. For example, the base station may send an offer to the user, which the user's mobile device may display. In some embodiments, users may pre-agree, as part of a service contract or other contractual exchange with the cellular service provider, to accept communications over the alternative frequency spectrum. Though, embodiments are also possible where agreement may be implied—such as when the allocated frequency for the base station is so congested that, even if the user were admitted to communicate with the base station using the allocated frequency spectrum, the user would receive such a small amount of bandwidth for communication with the base station that the user could be inferred to prefer to use the alternative frequency spectrum.

In some scenarios, a connection over the alternative frequency spectrum may not provide as high a bandwidth as a rated or target bandwidth for the cellular service. In some instances, the bandwidth achieved using the alternative frequency spectrum may be less than what could be achieved with communications using the assigned spectrum for the base station, even with congestion. In such scenarios, absent other incentives, the offer to use the alternative frequency spectrum may not result in a sufficient number of users accepting the offer to reduce congestion on the base station. Accordingly, users offered the option to connect on an alternative spectrum also may be offered incentives to agree to the alternative frequency.

The offered incentives may be financial, may relate to services provided by the cellular service provider or may be some other type of incentive. The nature of incentives also may depend on the nature of a service agreement between a user and the cellular service provider. As one example, if a user has a service agreement under which the user pays for data transfer, the user may be charged at a lower rate, or not at all, for data transfers made using the alternative frequency spectrum.

Users that receive an offer to communicate using the alternative frequency spectrum may be identified in any suitable way. For example, users may be identified based on total available bandwidth for the base station already consumed by other mobile devices at the time a new mobile device associates with the base station or, to preserve a consistent level of service as mobile devices move from cell to cell, at the time the mobile device associates with the cellular network. If total available bandwidth exceeds a threshold, all new users may be offered the option to use the alternative frequency spectrum. Alternatively or additionally, the users that receive an offer may be identified based on their usage at the time available bandwidth for the base station consumed exceeds the threshold. For example, those users who are engaging in low bandwidth communications, such as sending SMS messages, may be identified to receive the offer.

Alternatively or additionally, users may be identified to receive the offer based on location relative to the base station. Users who are closer to the base station may be preferentially receive the offer. As a specific example, users within a radius of 50 meters, may be identified to receive the offer. Because signal strengths for communications between nearby devices may be greater than if comparable communication equipment is used to communicate at a longer range, the devices that are closer together can communicate with less errors. Lower errors, in turn, results in greater percentage of the possible throughput for a channel being achieved for devices that are communicating at shorter ranges. Even though available throughput may be less using the alternative spectrum, achieving a greater percentage of that throughput may result in adequate communication, meaning that users close to the base station may experience less degradation in performance upon switching to the alternative frequency spectrum than users further away.

Turning to FIG. 1, an example of a communication system 100 according to some embodiments is illustrated. FIG. 1 illustrates a cellular communication system 100. In this example, two cells, cells 110A and 110B are illustrated. Though, one of skill in the art will appreciate that a cellular communication system may have numerous cells but that only two cells are shown for simplicity.

Each of the cells 110A and 110B includes a base station. Cell 110A includes base station 120A. Cell 110B includes base station 120B. Each base station is shown to contain a controller portion, 122A and 122B, respectively, and a transceiver portion 124A and 124B, respectively. Transceiver portions 124A and 124B transmit and receive signals carrying communications between the base station and mobile devices of users within the respective cells. For example, transceiver portion 124A exchanges wireless signals with mobile devices 140A, 142A and 144A, associated with users 130A, 132A and 134A, respectively. Transceiver portion 124B exchanges wireless communications with mobile devices 140B and 142B, which are associated with users 130B and 132B, respectively.

Communications exchanged between a base station and a mobile device may be controlled by the controller portions 122A and 122B of the base stations. According to some embodiments, controller portions 122A and 122B may exchange control messages with mobile devices within their cells to determine which mobile devices are admitted to communicate through the base station and to control other parameters of communication. Such control messages may be of the type that is conventionally controlled in a cellular communication system, though any suitable control scheme may be used. In addition, controller portions 122A and 122B may exchange control messages with mobile devices to specify a frequency spectrum that the mobile devices use for communications with the base station.

In a conventional cellular communication system, a cellular service provider may have an assigned frequency spectrum that is a portion of a frequency band allocated for use for cellular communications. Communications with mobile devices may be based on wireless communications occurring in that assigned frequency spectrum, though different devices may use different specific frequencies within the spectrum. Each of the base stations may communicate over such an assigned cellular communication spectrum. In accordance with some embodiments of the invention, each of the base stations additionally may be configured for communicating with mobile devices using an alternative frequency spectrum.

The specific frequency ranges associated with the assigned frequency spectrum and alternative frequency spectrum are not critical to the invention. However, in some embodiments, communication system 100 is configured to offer 3G cellular communication service. Accordingly, the assigned spectrum may be in the frequency range allocated for 3G communication.

The alternative frequency spectrum may encompass any suitable frequency range. Though, in some embodiments, the alternative frequency spectrum does not encompass frequencies assigned to the base station, and therefore does not overlap with the licensed frequency spectrum. In some embodiments, the alternative frequency spectrum may be a portion of a frequency spectrum allocated to another type of service other than cellular communication but unused in the geographic region of communication system 100. In some embodiments, the alternative frequency spectrum is white space within a frequency spectrum allocated for digital TV communication. Accordingly, transceiver portions 124A and 124B may be adapted to communicate both within the 3G frequency spectrum and the digital TV frequency spectrum. Controllers 122A and 122B may be adapted to control the operation of transceivers 124A and 124B such that communications with different ones of the mobile devices within each cell communicate using either frequencies within the assigned frequency spectrum or frequencies within the alternative frequency spectrum.

In order to coordinate communications with the mobile devices, controller portions 122A and 122B may cause transceiver portions 124A and 124B, respectively, to exchange control messages with the mobile devices. These control messages may perform functions associating with selecting mobile devices to communicate in the alternative frequency spectrum. Such functions may include instructing a mobile device to display an offer to a user to communicate using the alternative frequency spectrum, receiving from the mobile device a control message representing a user's response to the display of the offer or commanding the mobile device to communicate using either the alternative frequency spectrum or the assigned frequency spectrum for the cellular communication system. These control messages may be sent over a control channel associated with the cellular communication system. Though, the format and protocol used for exchanging such control messages is not critical to the invention and any suitable protocol may be used.

Once a mobile device is admitted for communication through a base station based on exchanged control messages, the mobile device may utilize the communication system to send and receive information through communications with the base station. The nature of the information communicated between mobile devices and the base stations also is not critical to the invention. In some scenarios, the information communicated will be high speed digital communications such as may be used to represent movie clips or other audio-visual information or that may be used to represent graphical content on web pages. Though, digital data, which may be communicated through communication system 100, may represent many other items. Moreover, it is not a requirement of the invention that the mobile devices be accessing digital content. For example, communications may entail voice communications. Accordingly, the nature of the communications is not critical to the invention.

Regardless of the nature of communications, at any given time, the number of users within a cell and the nature of their usage may be such that the base station in the cell may be regarded as not congested and may operate in a normal mode. For example, cell 110A contains three users 130A, 132A and 134A. Those three users, in the example of FIG. 1, may not be using their respective mobile devices in such a way that, in the aggregate, they consume the total available bandwidth of base station 120A.

As a specific numerical example, base station 120A may be constructed to support communications that in the aggregate involves 100 megabits per second (Mbps). During a first time, as illustrated in FIG. 1, mobile devices 140A, 142A and 144A may subscribe to cellular service in accordance with data plans that each provides five Mbps data rates. Accordingly, even if mobile devices 140A, 142A and 144A are communicating at the maximum data rates of their services, they will collectively consume less than 100 Mbps and will not overload base station 120. Thus, in this scenario, controller 120A has sufficient bandwidth to support communications with all the mobile devices within cell 110A using the assigned frequency spectrum.

Likewise, controller 120B in the state illustrated in FIG. 1, may have sufficient bandwidth to support communications on the assigned frequency spectrum with all of the devices within cell 110B. In the state illustrated in FIG. 1, all of the illustrated mobile devices may be communicating as in a conventional 3G communication system.

Figure 2:
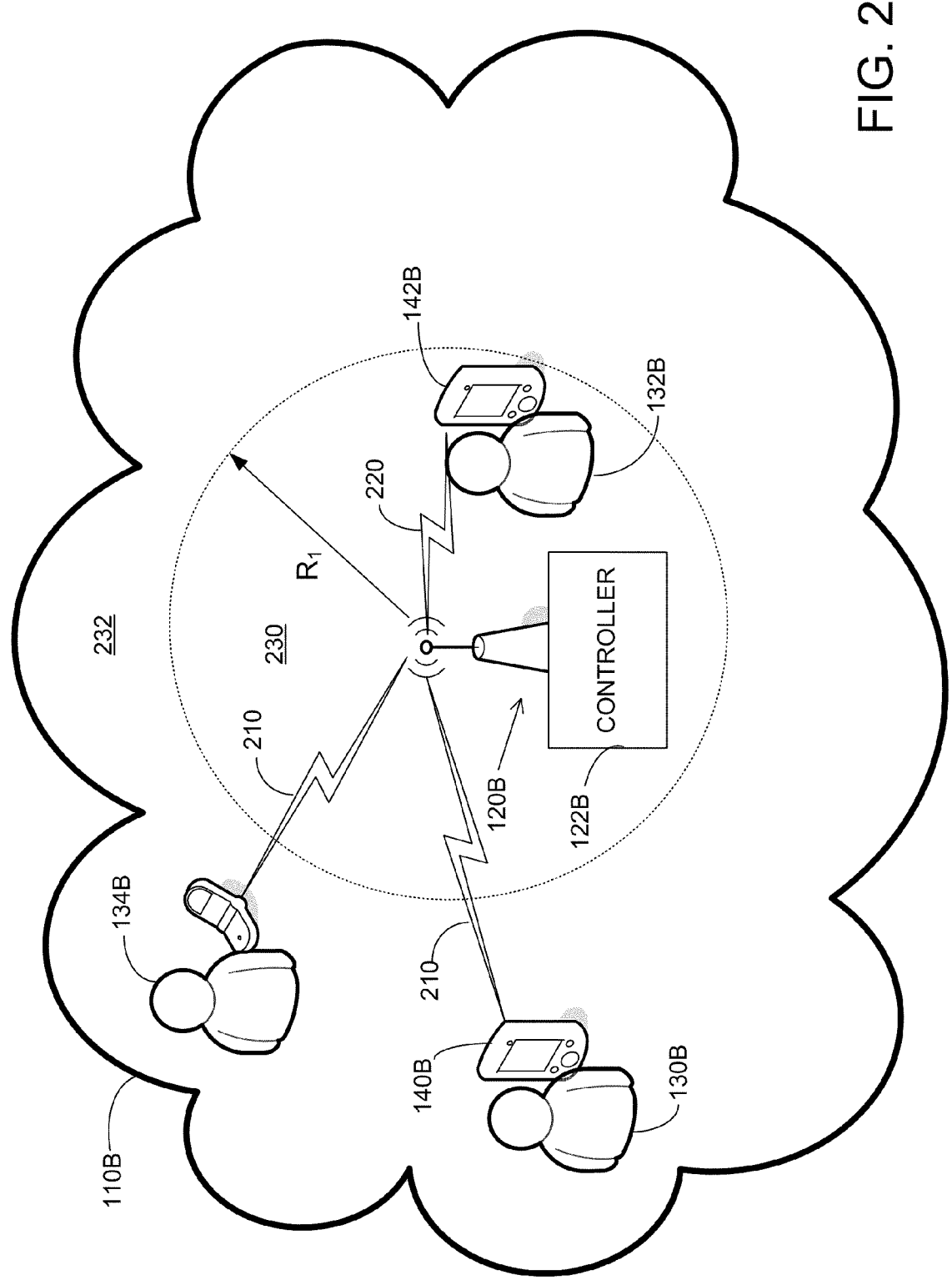
FIG. 2 is a conceptual sketch of a cell of the communication system of FIG. 1 operating at a second time.

Congestion may occur if the mobile devices of all the users within a cell, in the aggregate, consume or are projected to consume more than the total available bandwidth the base station has for communication using the assigned frequency spectrum. FIG. 2 illustrates cell 110B at a second time at which such congestion may occur.

Between the first time, illustrated in FIG. 1, and the second time, illustrated in FIG. 2, additional users have entered cell 110B. For simplicity of illustration, FIG. 2 shows three users, users 130B, 132B and 134B, in cell 110B. This number of users is shown for simplicity of illustration. One of skill in the art will recognize that more than three users may, in many embodiments of a cellular communication system, operate within a cell without overloading a base station. Nonetheless, in the simple example of FIG. 2, adding a third user, user 134B, represents an increase in the load on base station 120B. When the load on base station 120B increases to the point that the base station is congested, controller portion 122B may enter a mode in which it attempts to switch one or more users to communicate using an alternative frequency spectrum. In this way, bandwidth may be offloaded from the assigned frequency spectrum to the alternative frequency spectrum.

The addition of user 134B at a second time represented by FIG. 2 may be taken as an example of a triggering event for a base station entering an offload mode of operation. Other events may trigger controller portion 122B to enter a mode of offloading communications from the assigned frequency spectrum. For example, a time of day known from historical data to result in congestion may be regarded as a triggering event. An aggregate number of users within a cell exceeding a threshold or an aggregate number of users with a certain type of data plan, such as a data plan having a service guarantee for a relatively high bandwidth, may each be regarded as triggering events in some embodiments. As a further example, it is not a requirement tha the triggering event be based on actual usage. In some embodiments, a triggering event may be based on a projected load.

Regardless of the triggering event, controller portion 122B may then select one or more users to communicate using the alternative frequency spectrum. In some embodiments, the selected users may be those who agree to use the alternative frequency spectrum. For example, base station 122B may select mobile devices to communicate using the alternative frequency spectrum by sending control messages to one or more mobile devices, commanding the mobile devices to prompt their respective users for agreement to communicate using the alternative frequency spectrum.

The mobile devices to which such control messages are sent may be identified in any suitable way. In some embodiments, each mobile device seeking to associate with base station 120B at a time when total load on the base station exceeds a threshold indicating congestion exists or is likely to occur, may receive such a control message. Accordingly, in the embodiment illustrated in FIG. 2, mobile device 144B may receive such a control message when user 134B enters cell 110B and mobile device 144B attempts to associate with base station 120B.

Though, in the embodiment illustrated in FIG. 2, range is used as a criterion for identifying mobile devices to receive control messages commanding display of an offer to a user. In the embodiment of FIG. 2, devices are identified based on proximity to base station 120B. As a specific example, mobile devices within a region 230 immediately surrounding base station 120 may receive a control message. In contrast, mobile devices in region 232 may not receive such a control message.

The region 230 in which mobile devices receive the control message may be determined in any suitable way. In the embodiment illustrated, the region 230 is determined based on range to base station 120B. Here, any mobile device that has a range less than $R_1$ may receive a control message instructing the mobile device to present to its user an offer to communicate using the alternative frequency spectrum. The range $R_1$ may be determined in any suitable way. In some embodiments, the range $R_1$ may be a predetermined amount, such as 50 meters, and may be the same for all cells. In other embodiments, the range $R_1$ may be selected in proportion to the size of the cell. In yet other embodiments, the range $R_1$ may be dynamically selected to yield a number of users accepting an offer to communicate over the alternative frequency spectrum such that load on the base station is reduced below a level associated with congestion. Regardless of how range $R_1$ is selected, in the embodiment illustrated in FIG. 2, only mobile device 142 is within range $R_1$ of base station 120B. Accordingly, only mobile device 142B receives a control message conveying an offer to accept communication in the alternative frequency spectrum.

Though, it is not a requirement that a single approach be used by a base station for identifying mobile devices to receive such a control message. For example, base station 120B may be programmed to initially attempt to solicit users of mobile devices within region 230 to communicate using the alternative frequency spectrum. If the load on base station 120B exceeds some threshold, even after soliciting users of devices within region 230 to use the alternative frequency spectrum, controller 120B may solicit devices outside of region 230 to communicate using the alternative frequency spectrum. Moreover, it should be recognized that any suitable combination of selection techniques may be employed with any suitable order of precedence. For example, base station 120B may be programmed to first select devices associated with a specific service plan within a predetermined range of base station 120. If soliciting such devices does not result in a sufficient number of mobile devices using the alternative frequency spectrum that the load on base station 120B is reduced below a congestion threshold, base station 120B may solicit devices with other service plans within a defined range or may select other devices, outside the region, based on other criteria.

Figure 3:
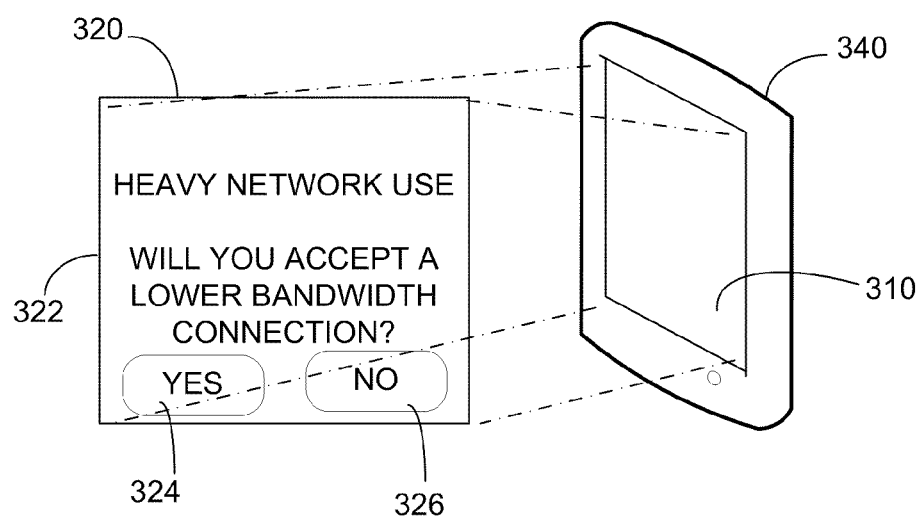
FIG. 3 is a sketch of a user interface of a mobile device operating in the communication system of FIG. 1.

Regardless of the manner in which devices are identified, identified devices may receive a control message that triggers the device to solicit user agreement to communication using the alternative frequency spectrum. FIG. 3 is an example of a mobile device 340 soliciting user agreement. In the example of FIG. 3, user agreement is solicited based on a message presented through a graphical user interface 320 on display 310.

In this example, graphical user interface 320 may display a message in text format, alerting the user of mobile device 340 to network congestion. This message may be communicated as text, though icons or other graphical elements may be used to alert the user of network congestion. FIG. 3 illustrates a simple message, presented in text, but it should be recognized that any suitable message format with any suitable level of detail may be used to communicate information concerning network congestion to the user.

In conjunction with the message alerting the user to network congestion, graphical user interface 320 may include one or more mechanisms through which a user of device 340 may consent to communications using the alternative frequency spectrum. In this example, the mechanism is text presenting an offer 322 to the user. In this example, the text states "will you accept a lower bandwidth connection?" this text does not expressly identify that the lower bandwidth connection is provided using the alternative frequency spectrum, and express identification of the alternative frequency spectrum is not a requirement of the invention. Though, in other embodiments, different or additional information my be presented to the user which may describe the mechanism by which the lower bandwidth connection is provided.

Additionally, offer 322 is not, in this example, expressly shown to include an incentive. Though, offer 322 may include an express description of an incentive for the user to consent to a lower bandwidth connection.

Regardless of the form and content of an offer, once an offer is made to a user input reflecting consent or rejection of the offer may be obtained in any suitable way. In the example of FIG. 3, in which the offer is presented through graphical user interface 320, user input may be obtained through one or more controls. As an example, graphical user interface 320 is shown to contain controls 324 and 326. Controls 324 and 326 may be implemented user technology as is known in the art for implementing a graphical user interfaces. Selection of control 324 by a user may signify consent to communication using the alternative frequency spectrum. Selection of control 326 by the user may signify rejection of the offer to communicate over the alternative frequency spectrum.

One of skill in the art will recognize that FIG. 3 illustrates just one example of a user interface through which an offer may be presented to a user an in response user input may be obtained. Such an exchange may occur using other forms of graphical user interfaces or other forms of interface entirely. For example, the exchange may be made based on generated speech and the user input may be obtained through speech recognition.

Regardless of the manner in which the exchange of offer and user input occurs, if the user consents to communication using the alternative frequency spectrum, mobile device 340 may be configured to communicate using the alternative frequency spectrum. In some embodiments, consenting to communication using the alternative frequency spectrum may temporarily limit the functions performed by mobile device 340. For example, mobile device 340 may temporarily not perform operations that require communication of large amounts of data. As a specific example, when mobile device 340 is configured for communication in the alternative spectrum, it may not process user request to download multi-media files or stream multi-media content. Though, in other embodiments, when mobile device 340 is configured to communicate using the alternative frequency spectrum, it may provide all functions, though performance of those functions involving transfers of large amounts of data may be degraded by limited bandwidth available using the alternative frequency spectrum.

Once a user has consenting to communicate using the alternative frequency spectrum, this consent may remain in effect for a limited period of time after which mobile device 340 may again communicate using the assigned frequency of cellular communication system 100. That limited amount of time may be a predetermined fixed amount of time or may be determined dynamically. That time could be determined dynamically based on congestion within the cell containing mobile device 340, for example. Accordingly, if aggregate bandwidth usage within the cell containing mobile device 340 decreases or mobile device moves into a different cell, mobile device 340 may revert to communicating using the assigned frequency spectrum. In other embodiments, that limited time may be until mobile device 340 is turned off, resets, receives user input indicating that the user would like a higher bandwidth connection or other triggering event associated with user device 340.

In some embodiments, users may be offered an option to communicate using an alternative frequency spectrum based on congestion in a region of communication system 100 that extends beyond a single cell. Such a region may have any suitable boundaries. The boundaries, for example, may be based on distance from a cell or may be tied to geopolitical boundaries. In such a scenario, if a user consents to communicating using the alternative frequency spectrum, communications with that user's mobile device may occur over the alternative frequency spectrum for as long as the user is within the larger region and overall network usage in that larger region indicates congestion. As a specific example, a larger region may be a city or metropolitan area such that a user who accepts communication over the alternative frequency spectrum while at any location within that larger region may continue to communicate over the alternative frequency spectrum even as the user moves from cell to cell within that larger geographic region.

Figure 4:
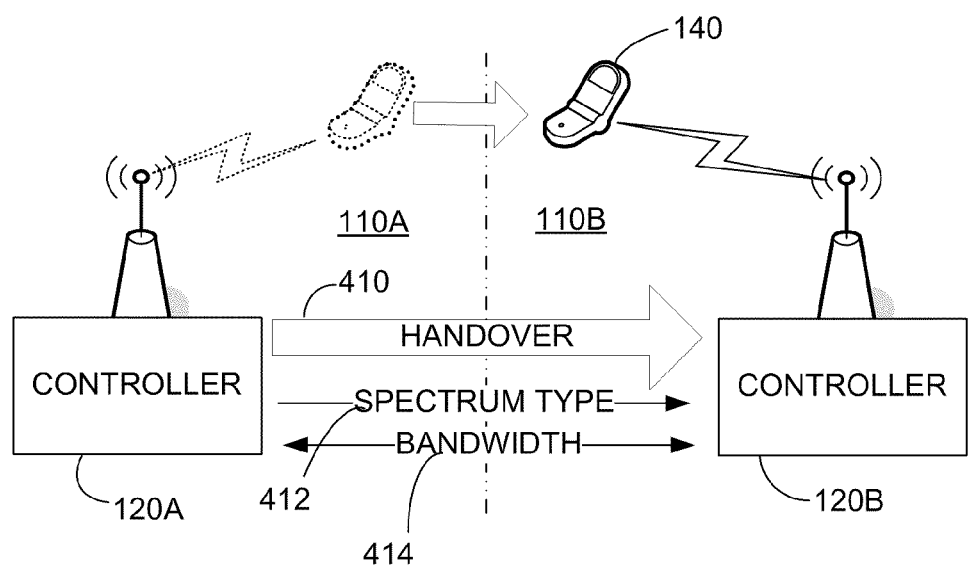
FIG. 4 is a conceptual illustration of a handover between base stations in the communication system of FIG. 1.

FIG. 3 illustrates a manner by which user consent to communicate over the alternative frequency spectrum may follow the user as a the user moves from cell to cell. FIG. 4 illustrates a mobile device 140 that a user moves from a cell 110A to cell 110B. While in cell 110A, mobile device 140 may communicate with base station 120A. When mobile device 140 moves to 110B, mobile device 140 may communicate through bay station 120B. In passing from cell 110A to 110B, base station 120A may hand over responsibility for communication with mobile device 140 to base station 120B.

Handover of mobile devices from a base station to an adjacent base station is known in the art. Accordingly, base stations in a cellular communication system are themselves networked such that information may be readily passed from one base station to another. FIG. 4 illustrates handover information 410 passing over such a network from base station 120A to base station 120B. Handover information 410 may represent information as is known in the art.

Though, FIG. 4, illustrates that, in addition to handover information 410, base station 120A provides spectrum type information 412 associated with the handover of mobile device 140 to base station 120B. Spectrum type information 412 may signify to base station 120B whether the user of mobile device 140 has selected the option of communicating using the alternative frequency spectrum. In this way, if the user of mobile device 140 has consented to communicate using the alternative frequency spectrum, when base station 120B establishes communication with mobile device 140, it will do so using the alternative frequency spectrum.

In addition, FIG. 4 illustrates that base stations may communicate other information useful in implementing spectrum offload in accordance with some embodiments of the invention. As shown in FIG. 4, base stations may exchange bandwidth usage information 414. Such information may allow base stations to determine aggregate network usage such that each base station may determine whether cellular communications system 100 in the aggregate is operating above a congestion threshold. Such information may be useful in embodiments in which users of mobile devices are offered an option to communicate in an alternative frequency spectrum based on congestion in the communication system or a larger region of the cellular communication system, instead of or in addition to congestion in a single cell. Such information may also be useful in embodiments in which mobile devices, once they begin communicating over the alternative frequency spectrum continue to communicate over that alternative frequency spectrum so long as the communication system, in at least a relevant region operates in a congested state.

FIG. 4 provides a conceptual sketch of information that may be exchanged between base stations. One of skill in the art will recognize that the information need not be communicated directly between base stations. For example, though not shown in FIG. 4, handover information or other types of information may be conveyed from one base station to another through one or more other network control devices. Though, the mechanism by which information is communicated between base stations is not critical to the invention and any suitable mechanism may be employed.

Figure 5:
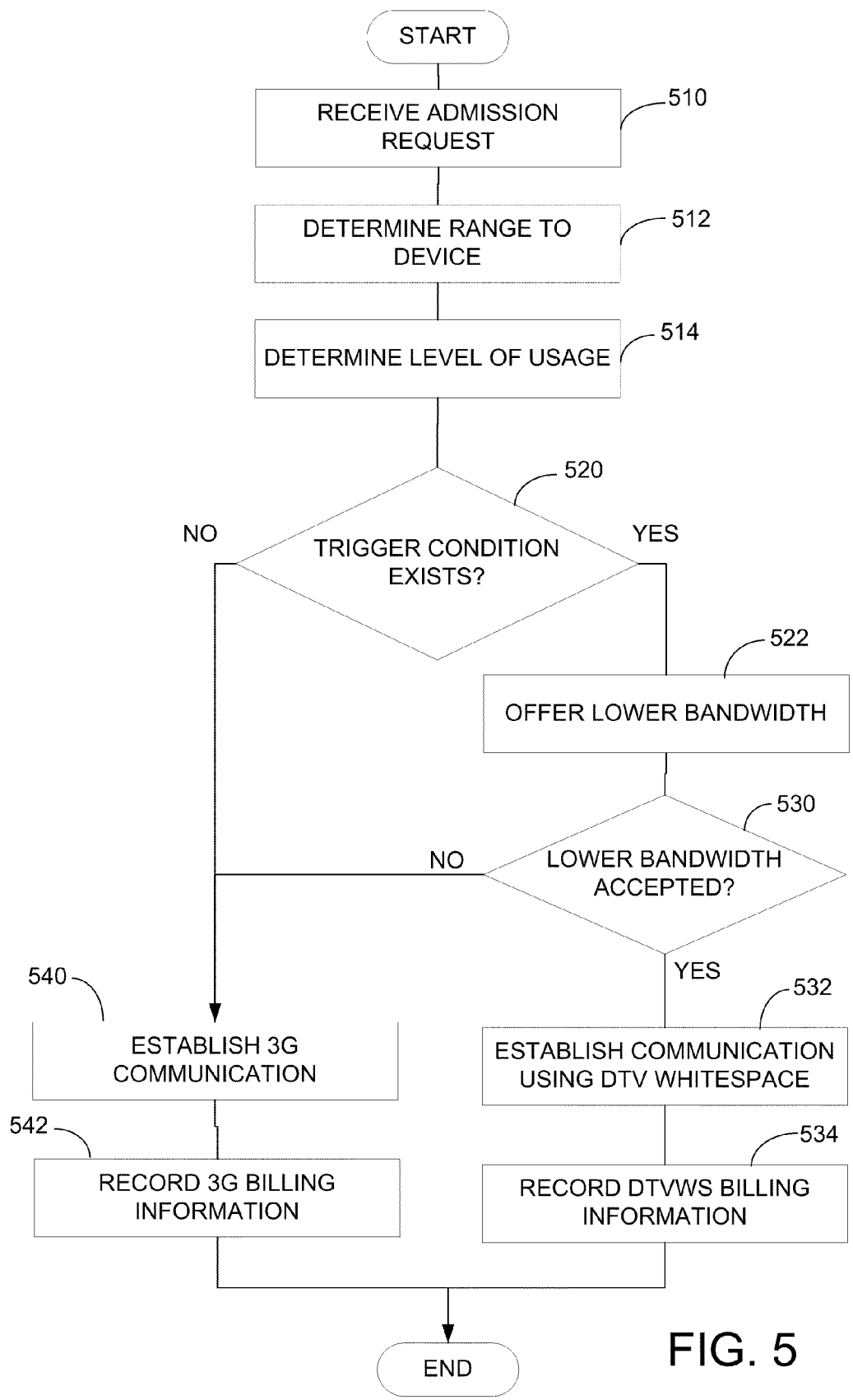
FIG. 5 is a flow chart of a method of operation of a base station in the communication system of FIG. 1.

Turning now to FIG. 5, a flow chart of an exemplary process by which a base station may operate according to some embodiments is illustrated. The process of FIG. 5, begins when the base station receives an admission request from a mobile unit. Such an admission request may be an admission request of the type known in the art for use in cellular communication systems. The admission request may be associated with a mobile device moving into the cell containing the base station. Though, in some embodiments, an admission request may indicate that a mobile device has been powered on or for other reason is seeking admission to enable use of the communication system.

Regardless of the reason that the device is seeking admission, the device may generate a signal to the base station, which may be received at block 510.

In response to a received admission request, the base station may determine whether a trigger condition for offering the user of the mobile device an option to communicate over the alternative frequency spectrum exists. In the example illustrated in FIG. 5, the trigger condition is based on both aggregate network usage and range between the base station and the mobile device. Accordingly, in processing at block 512, the base station may determine the range to the mobile device seeking admission.

Any suitable technique may be used to determine range. For example, many communication systems include circuitry to make time of flight measurements that can be converted into an estimate of range. In other scenarios, cellular communication systems may use triangulation approaches to determine a location of a mobile device, which in turn indicates a range to the device. Regardless of the manner in which the range is determined, processing may proceed to block 514.

At block 514, the base station may determine a level of usage within the network. The level of usage may be associated with any portion of the communication system. For example, in some embodiments, usage may be determined solely within the cell occupied by the base station performing the process of FIG. 5. In other embodiments, the usage may be an aggregate usage over a region containing that cell. Regardless, the level of usage may be determined in any suitable way. In embodiments in which the level of usage is tied to the cell containing the base the station, the usage may be determined by parameters of active communications with all of the mobile devices in that cell. In other embodiments, a projected usage level may be determined at block 514. The projected usage level may be based on an aggregate allocated bandwidth for the number of mobile devices actively communicating with the base station. Though, any other suitable metric may be used as an indication of a level of usage.

Regardless of how the usage is determined, the process may proceed to decision block 520. At decision block 520, the process may branch, depending on whether a trigger condition exists. In this trigger condition is based on the determined range at block 512 and the determined level of usage at block 514. If the determined level of usage exceeds a threshold, such that the network or base station is deemed to be in a congested state, and the device is within a range meeting a range criterion, the mobile device seeking admission may be identified as a device to receive an offer for communication over the alternative frequency spectrum.

Accordingly if a trigger condition exists such that the mobile device is to receive an offer, the process may branch at decision block 520 to block 522. At block 522 the base station may send one or more control message signifying an offer to communicate using a lower bandwidth. If the offer is accepted by the user of the device, the process may branch at decision block 530. The processing at decision block 530 may be based on one or more control messages received from the mobile device. If those received control messages indicate that the offer of lower bandwidth is accepted, the process may proceed to block 532.

At block 532 the base station may establish communication with the mobile device using the alternative frequency spectrum. In the embodiment illustrated in FIG. 5, the alternative frequency spectrum is the digital television (DTV) spectrum. To avoid interfering with DTV communications, the base station may establish communication within white space of the DTV spectrum.

Once communication is established using the alternative frequency spectrum, the process may proceed to block 534 where the base station records billing information. The billing information recorded at block 534 may factor in an incentive offered to a user to consent to communication using a lower bandwidth, alternative frequency spectrum. Such an incentive, for example, may be reflected in a lower rate recorded for data communications using the alternative frequency spectrum. However, any suitable incentive may be offered and the processing at block 534 may reflect billing in accordance with the incentives.

Conversely, if it is determined at decision block 520 that the mobile device seeking admission does not satisfy the trigger conditions used to identify devices to receive an offer of lower bandwidth communication, the process may branch from decision block 520 to block 540. At block 540, the base station may establish communication using the assigned frequency spectrum for the base station. In the example of FIG. 5, the base station is communicating using a 3G wireless standard and communication is established at block 540 based on the frequency spectrum allocated for such 3G wireless communications.

The process may proceed to block 542 where billing information is recorded. In this example, the billing information recorded may be based on a service agreement of the user of the mobile device without incentives. Accordingly, the billing information recorded at block 542 may indicate a higher usage charge for data communications than the billing information recorded at block 534.

Similarly, if it is determined at decision block 530 that the user of the mobile device seeking admission does not consent to using the alternative frequency spectrum, the process may branch from decision block 530 to block 540. At block 540, communication may be established with the mobile device using the allocated frequency spectrum for the base station. The process then may proceed to block 542 as described above.

Figure 6:
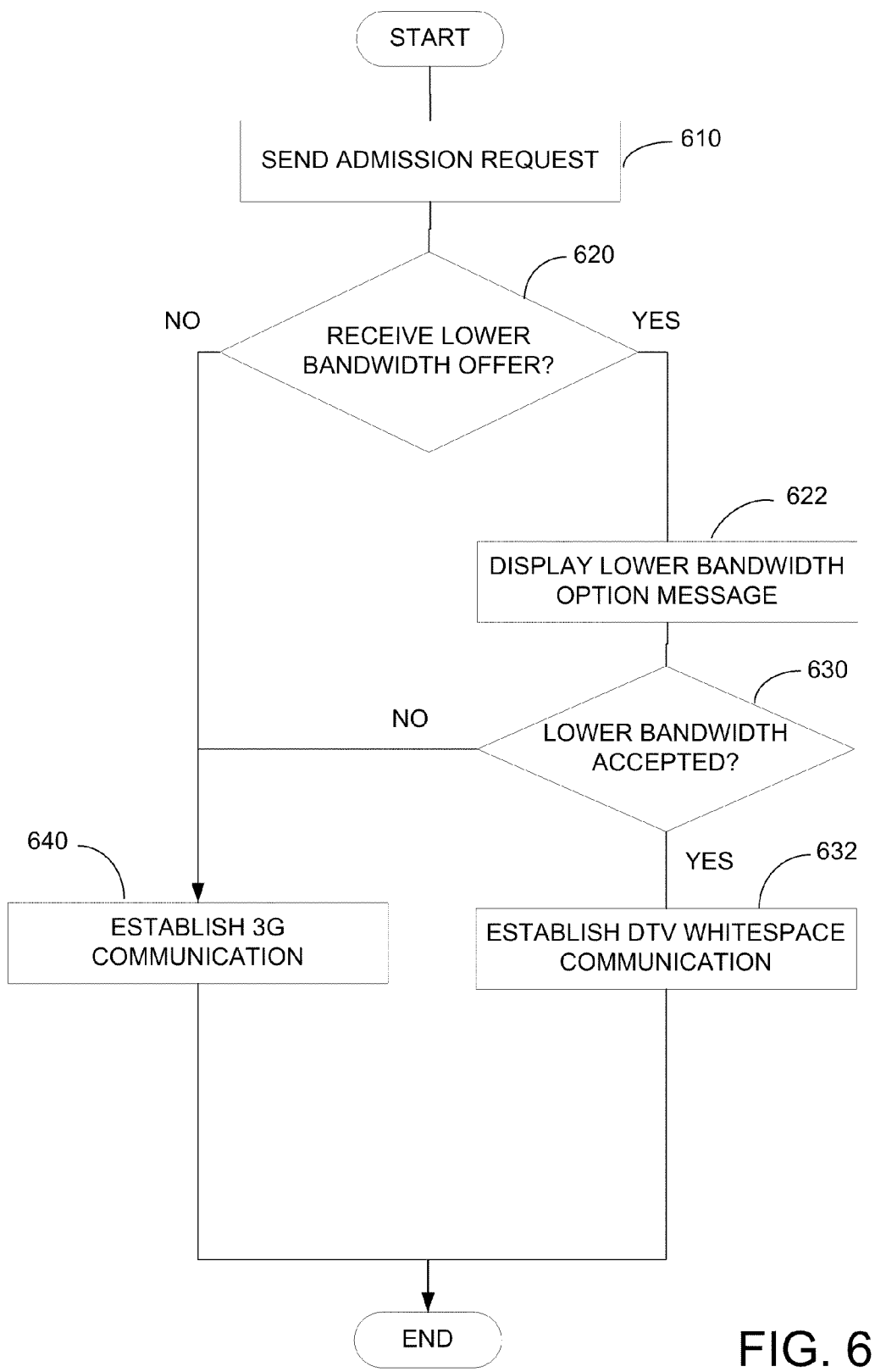
FIG. 6 is a flow chart of a method of operation of a mobile device associated with a base station in the communication system of FIG. 1.

FIG. 6 illustrates a corresponding process that may be performed on mobile device seeking admission for communication through a base station. The process of FIG. 6 may begin at block 610 where the mobile device may send an admission request to the base station.

Processing on the mobile device may branch at decision block 620, depending on whether the mobile device receives a control message indicating an offer to the user of the mobile device to use lower bandwidth. If such a control message is received, the process may branch to block 622. At block 622, the mobile device may display to its user the offer for communication using lower bandwidth. The process may again branch at decision block 630, depending on whether the user provides input indicating acceptance of the lower bandwidth offer. If the user accepts the offer for lower bandwidth communication, the process may proceed from decision block 630 to block 632. At block 632, the mobile device may establish communication using DTV white space.

Conversely, if it is determined at block 630 that the user has rejected the offer or otherwise has not consented to communication at a lower bandwidth, the process may branch from decision block 630 to block 640. At block 640, the mobile device may establish communication using the allocated frequency spectrum of the base station. In the example in which the mobile device is a 3G wireless device, processing at block 640 may entail establishing communication using the 3G wireless standard.

Conversely, if the mobile device does not meet criteria for receiving a bandwidth for an offer of lower bandwidth communication or a congestion condition is not present, the process may branch from decision block 620 to block 640. As described, when the process reaches block 640, the mobile device may establish communication using the assigned frequency spectrum of the base station, which is the 3G wireless spectrum in this example.

Processing illustrated by the flow charts of FIGS. 5 and 6 may be performed in any suitable way. The processing of FIG. 5, for example, may be implemented by programming within a base station. Likewise, processing illustrated by the flowchart of FIG. 6 may be performed using programming in a wireless device. Though, it should be recognized that one or more of the steps of the processes in FIG. 5 and/or FIG. 6 may implemented in hardware, firmware or some combination of hardware firmware, and software or may be implemented in any suitable way.

Figure 7:
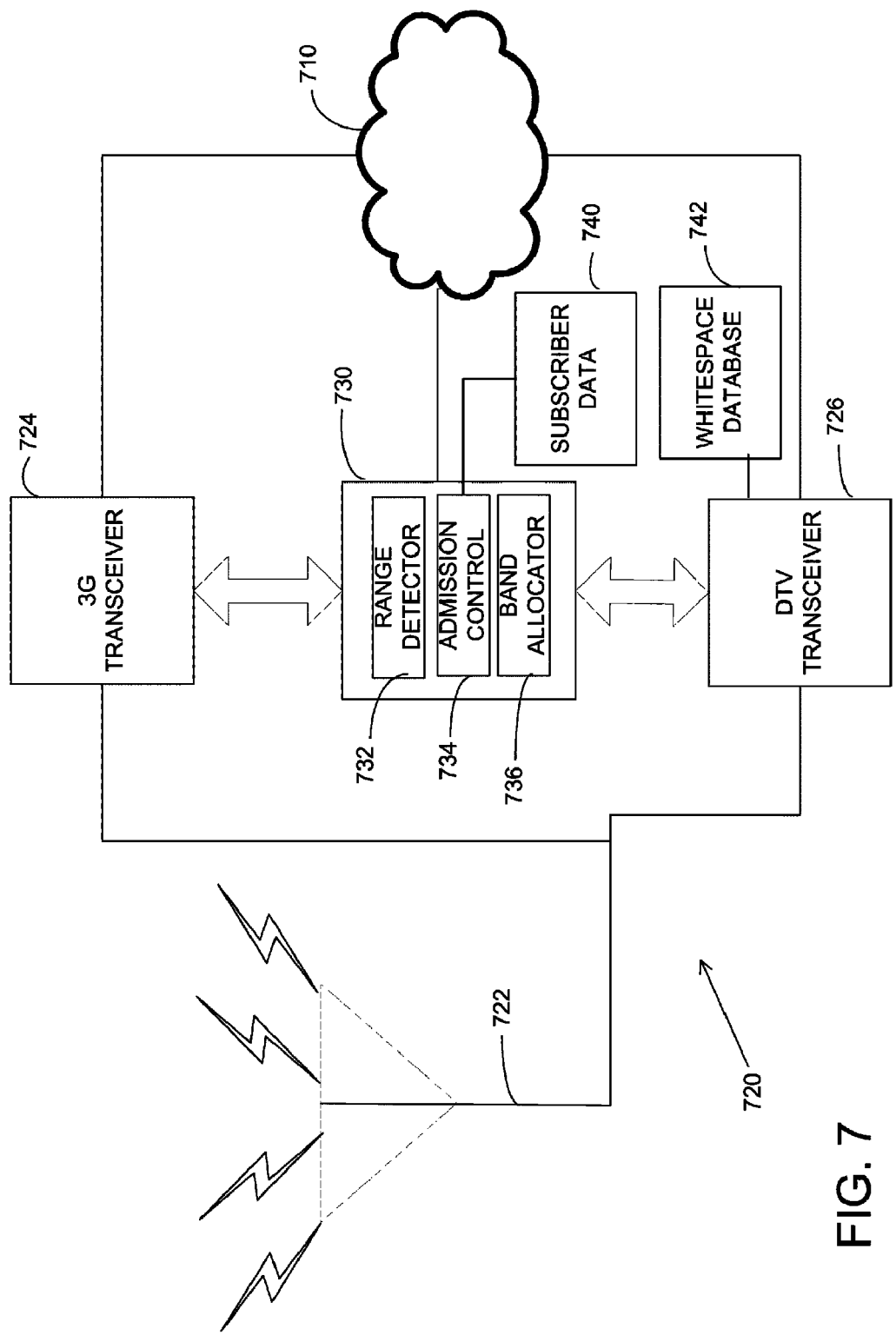
FIG. 7 is a functional block diagram of a base station in the communication system of FIG. 1

A base station adapted for performing the process illustrated in FIG. 5 may be constructed in any suitable way. Construction techniques as are known in the art for constructing components of a communication system may be employed. Though, a base station may be adapted to implement spectrum off load from an assigned spectrum to an alternative frequency spectrum as illustrated in FIG. 7. FIG. 7 illustrates a base station 720. In the example of FIG. 7, base station 720 includes a 3G transceiver 724. 3G transceiver 724 is coupled to antenna 722 through which 3G transceiver 724 may communicate with multiple mobile devices using a frequency spectrum corresponding to the frequency spectrum assigned to a cellular communication system. In this example, the cellular communication system is a 3G wireless system and 3G transceiver 724 is adapted to communicate using the frequency spectrum associated with 3G communications. Accordingly, transceiver 724 may be a transceiver as is known in the art for a 3G wireless communication system.

Additionally, base station 720 is illustrated as containing a DTV transceiver 726. DTV transceiver 726 is configured for communication in an alternative frequency spectrum, in this case, the DTV spectrum. DTV transceiver 726 may be constructed using techniques as are known in the art. Though, rather than communicating DTV information, DTV transceiver 726 communicates in portions of the DTV spectrum that are unused for DTV signals. Accordingly, DTV transceiver 726 includes a mechanism to identify unused portions of the DTV spectrum. In this example, DTV transceiver 726 is shown coupled to whites space database 742. Whites space database 742 may contain information about unused portions of the DTV spectrum in the vicinity of base station 720, and therefore may be used to identify the frequency spectrum that may be used for lower bandwidth communication.

Further, though DTV transceiver 726 may operate in the same spectrum that is used to communicate DTV information, may not communication using the same format or protocol that is used to communicate DTV signals. Rather, DTV transceiver 726 may be configured, as one example, to communicate digital data in a standard conventionally used for wireless communications between computing devices. As a specific example, DTV transceiver 726 may be configured for communications using a WiFi or WiMAX standard. Though it should be recognized that any protocol, whether standard or custom, may be used.

Base station 720 may also contain a control portion 730. Control portion 730 may be constructed using known construction techniques. Though, control portion 730 may be constructed in any other suitable way. Control portion 730 may contain components that perform processing as in a conventional base station. For example, admission control component 734 may exchange control messages with a mobile device seeking admission for communication through base station 720.

Admission control component 734 may access subscriber data 740 to determine whether a mobile device seeking admission is authorized for communication. Admission control components 734 may access subscriber data 740 to determine whether the mobile device is associated with an authorized user. Accordingly, subscriber data 740 may include subscriber data as is known in the art. Additionally, subscriber date 740 may contain information indicating whether a user has consented to communicate using a lower bandwidth during intervals when a congestion condition exists in a communication system. Alternatively or additionally, subscriber data 740 may include information on a subscribers' service plans which, alternatively or additionally may be used to identify mobile devices to receive offers for communicating using lower bandwidth.

Band allocator component 736 may access this subscriber data to determine whether a mobile device is to be provided an offer to communicate using a lower bandwidth. Band allocator component 736 may also track congestion conditions to determine when an offer to communicate at lower bandwidth is to be made. Band allocator component 736 may also receive input from other sources that may be used to identify mobile devices to receive such an offer. In the example of FIG. 7, control portion 730 is shown with a range detector component 732. Range detector component 732 may measure a range between the base station and a mobile device seeking admission to the network. This range information may be provided to band allocator component 736 for use in identifying which mobile devices receive an offer for lower bandwidth communication.

In the embodiment of FIG. 7, 3G transceiver 724, DTV transceiver 726 and control portion 730 are shown coupled to a network 710. Network 710 may be one or more different networks allowing base station 720 to exchange multiple types of information with other components that form a communication system. For example, network 710 may provide a gateway to the Internet such that network messages from a mobile device received either through 3G transceiver 724 or DTV transceiver 726 may be routed to servers or other components accessible through the Internet. Likewise, information may be routed from those component through either 3G transceiver 724 or DTV transceiver 726 to a mobile device. Alternatively or additionally, network 710 may allow control portion 730 to interact with other base stations or components that control the communication system. Such a network connection, for example, may facilitate sharing of congestion information and handover information. Also, it should be appreciated that FIG. 7 illustrates subscriber data 740 and white space data base 742 being local to base station 720. Either or both of these sources of data may be resident on a component accessible through network 710. Accordingly, it should be appreciated that FIG. 7 is an illustration of a possible configuration for a base station, but other configuration are possible.

Though not expressly illustrated in FIG. 7, a mobile device communicating with base station 720 may have components corresponding to 3G transceiver 724, DTV transceiver 726 and control portion 730. These components in a mobile device may be constructed using techniques as are known in the art. Though, in combination, they provide a mobile device an ability to communicate over an assigned frequency spectrum for a cellular communication or communicate over an alternative frequency spectrum. Additionally, such components may be adapted to control the mobile device to receive commands indicating an offer is to be presented to a user of the device and receive and convey user consent to or rejection of that offer.

Having thus described several aspects of at least one embodiment of this invention, it is to be appreciated that various alterations, modifications, and improvements will readily occur to those skilled in the art.

For example, it was described that congestion on a base station was determined based on actual usage of mobile devices within a cell. In some embodiments, congestion may be determined in other ways. As one example, congestion may be based on aggregate bandwidth allocated or budgeted for devices operating within a cell. For example, each mobile device associated with a base station may be allocated an amount of bandwidth. In some embodiments, all mobile devices may be allocated the same amount of bandwidth. Though, amounts of bandwidth may be allocated based on a subscription plan of a user of a device, such that different devices have different allocations. As another example, each device may be allocated an amount of bandwidth based on the characteristics of a device, such at that each device receives an allocation equal to the full or a fractional amount of the maximum bandwidth it could consume. Regardless of how bandwidth is allocated, congestion could be detected if the sum of the allocated bandwidth for all mobile devices exceeds the capacity of the base station.

As an example of another variation, congestion could be predicted rather than measured. Prediction could be based on historical usage pattern. For example, a base station could be deemed overloaded such that users are selected to receive an offer to communicate using the alternative frequency spectrum at times of day that have historically been congested, even if actual usage at that time is below the capacity of the base station.

Also, trigger conditions for changing frequency spectrum used by the base station were described in relation to cell or network congestion. Other suitable events may constitute trigger conditions. For example, degradation in performance, low battery level, and/or increase in RF power required for the mobile device to communicate effectively with the base station.

These trigger conditions may be detected solely by components operating on the base station. Though, it should be appreciated that the a mobile device may identify a trigger condition and signal the trigger condition to the base station. For example, either or both the base station and the mobile device may detect a bit error rate exceeding a threshold as an indication of performance degradation.

Further, embodiments are described in which, upon detection of a trigger condition, a base station switches from using a licensed spectrum to using an unlicensed spectrum for communication with a portion of the mobile devices in its cell. The alternative frequency spectrum need not be unlicensed. As an alternative, the alternative frequency spectrum may be a lower quality licensed spectrum, Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a communication service of the type that comprises at least one base station adapted for exchanging communications with multiple mobile devices within a region, the method comprising:
   during a first interval, exchanging communications with each of a first plurality of mobile devices within the region, the communications with the plurality of devices collectively using a first amount of bandwidth within a licensed spectrum assigned to the base station;
   in a second interval during which the region contains a second plurality of mobile devices, determining that a trigger condition exists based on the second plurality of mobile devices; and
   when it is determined that a trigger condition exists, exchanging communications with a first portion of the second plurality of mobile devices using the licensed spectrum and exchanging communications with a second portion of the second plurality of mobile devices using an alternative frequency spectrum, the alternative frequency spectrum being different than the first licensed spectrum.

2. The method of claim 1, wherein:
   exchanging communications with a first portion of the second plurality of mobile devices using the licensed spectrum comprises communicating in accordance with a 3G standard; and
   exchanging communications with a second portion of the second plurality of mobile devices using the alternative frequency spectrum comprises exchanging communications using a digital TV channel that is unassigned in the region.

3. The method of claim 1, further comprising:
   selecting the second portion of the second plurality of mobile devices based at least in part on position within the region.

4. The method of claim 3, wherein the selecting the second portion comprises identifying mobile devices of the second plurality of mobile devices that are less than a threshold distance from the base station.

5. The method of claim 4, further comprising:
   determining the threshold distance based on one or more of time of day and total bandwidth used by communications exchanged with the base station at the second time.

6. The method of claim 1, wherein:
   the method further comprises receiving a request from a mobile device to initiate communication with the base station; and
   the determining at the second time occurs in response to receiving the request.

7. The method of claim 6, further comprising:
   in response to the request, sending to the mobile device, a communication indicating an option to communicate using the alternative frequency spectrum;
   receiving a response to the option; and
   charging for communications exchanged with the mobile device, the charging comprising charging at a lower rate when the response to the option indicates an election to communicate using the alternative frequency spectrum than when the response to the option indicates an election to communicate using the licensed spectrum.

8. The method of claim 1, wherein:
   determining that the trigger condition exists comprises determining that the region contains a second plurality of mobile devices such that exchanging communications with the second plurality of mobile devices using the first licensed spectrum would consume a second amount of bandwidth, the second amount of bandwidth exceeding a threshold; and
   when it is determined that the trigger condition exists, exchanging communications with the second portion of the second plurality of mobile devices comprises exchanging communications with the second portion of the second plurality of mobile devices using white space in a second licensed spectrum, the second licensed spectrum being different than the licensed spectrum.

9. A base station for a communication system providing a first service, the base station comprising:
   at least one transceiver supporting communications with a plurality of mobile devices using a first bandwidth in a first licensed spectrum and using a second bandwidth in a second licensed spectrum, the first bandwidth in the first licensed spectrum being allocated for use by the communication system in providing the first service and the second bandwidth in a second licensed spectrum allocated for use in providing a second service, different than the first service;
   a control module to:
      determine cumulative bandwidth consumption in the first licensed spectrum by mobile devices having a connection to the base station;
      determine whether the cumulative bandwidth consumption is above a threshold; and
      when the cumulative bandwidth consumption is above the threshold, configure the at least one transceiver for communication with a first set of mobile devices using the first bandwidth and a second set of mobile devices using the second bandwidth.

10. The base station of claim 9, wherein:
    the control module further comprises a range detection component, the range detection component being adapted to determine a range between the base station and a mobile device in the vicinity of the base station;
    the control module comprises a band allocation component, the band allocation component assigning mobile devices of the plurality of devices to the second set based on a range determined by the range detection component for each device assigned to the second set being below a second threshold.

11. The base station of claim 9, wherein:
    the control module comprises a band allocation component, the band allocation component assigning mobile devices of the plurality of devices to the second set based on a requested bandwidth received from each device assigned to the second set being below a threshold.

12. The base station of claim 9, wherein:

the control module further comprises a range detection component, the range detection component being adapted to determine a range between the base station and a mobile device in the vicinity of the base station;

the control module comprises:

an admission control component, the admission control component being adapted to exchange communications with mobile devices seeking a connection to the base station, the communications comprising requests to accept a lower bandwidth sent from the admission control component and a responses from mobile devices indicating acceptance of the lower bandwidth; and a band allocation component, the band allocation component being adapted to assign mobile devices of the plurality of devices to the second set based on responses from the mobile devices indicating acceptance of the lower bandwidth.

13. The base station of claim 9, wherein:

at least one transceiver is adapted for exchanging communications with mobile devices assigned to the first group at a data rate in excess of 2 Mps and for exchanging communications with mobile devices assigned to the second group at a data rate less than 1 Mps.

14. The base station of claim 9, wherein:

the base station is a first base station; and the control module is further adapted to communicate information to a second base station of the communication system, the information comprising handover information relating to a mobile device being handed over to the second base station and band allocation information, the band allocation information indicating whether the mobile device being handed over is assigned to the second subset.

15. The base station of claim 9, wherein:

the base station is a first base station; and the control module is further adapted to exchange information to a second base station of the communication system, the exchanged information identifying cumulative bandwidth consumption for the communication system in the vicinity of the first and second base stations.

16. A method of operating a cellular communication service of the type that comprises a base station adapted for exchanging communications with multiple mobile devices within a region, the method comprising:

during a first interval, exchanging communications with each of a first plurality of mobile devices within the region, the communications with the plurality of devices collectively using a first amount of bandwidth within a first licensed spectrum;

at a second time determining that the region contains a second plurality of mobile devices such that exchanging communications with the second plurality of mobile devices using the first licensed spectrum would consume a second amount of bandwidth;

determining that the second amount of bandwidth exceeds a threshold; and when it is determined that the second amount of bandwidth exceeds the threshold:

identifying a first portion of the plurality of mobile devices and a second portion of the plurality of mobile devices based on inputs from users of the plurality of mobile devices; and exchanging communications with the first portion of the second plurality of mobile devices using the first licensed spectrum and exchanging communications with a second portion of the second plurality of mobile devices using white space in a second licensed spectrum, the second licensed spectrum being licensed to provide digital television service.

17. The method of claim 16, wherein identifying a first portion of the plurality of mobile devices and a second portion of the plurality of devices based on inputs from users comprises:

selecting a mobile device of the second plurality of mobile devices based on a range from the base station; and sending a request to the selected mobile device to accept a lower bandwidth connection; and identifying the selected mobile device as within the second portion when a response to the request indicates acceptance of a lower bandwidth.

18. The method of claim 16, wherein identifying a first portion of the plurality of mobile devices and a second portion of the plurality of devices based on inputs from users comprises:

selecting a mobile device of the second plurality of mobile devices based on a range from the base station;

accessing scriber information for the selected mobile device; and identifying the selected mobile device as within the second portion when the subscriber information indicates acceptance of a lower bandwidth.

19. The method of claim 16, further comprising:

selecting the second portion of the second plurality of mobile devices based at least in part on a distance between the base station and each device of the second plurality of devices selected as being within the second portion.

20. The method of claim 19, wherein selecting the second portion comprises:

offering to devices within a predetermined range of the base station a lower bandwidth connection;

selecting as the second portion those devices responding to the offer with an acceptance of the offer.

\* \* \* \* \*